No. 852,986. PATENTED MAY 7, 1907.
F. N. STEVENS.
TIRE PLUG.
APPLICATION FILED JAN. 24, 1907.

Witnesses:
Edward Rowland.
William H. Mohr.

Inventor
Frank N. Stevens
By his Attorney
Andrew Wilson

UNITED STATES PATENT OFFICE.

FRANK N. STEVENS, OF RUTHERFORD, NEW JERSEY.

TIRE-PLUG.

No. 852,986.     Specification of Letters Patent.     Patented May 7, 1907.

Application filed January 24, 1907. Serial No. 353,784.

*To all whom it may concern:*

Be it known that I, FRANK N. STEVENS, a citizen of the United States, residing at Rutherford, New Jersey, have invented certain new and useful Improvements in Tire-Plugs, of which the following is a specification.

My invention relates to tire plugs wherein a screw-threaded shank carries clamping members for gripping the inner and outer faces of a pneumatic tire between them so as to effectually close a leak or puncture therein, and my improvements consist in the particulars hereinafter set forth.

Figure 1:
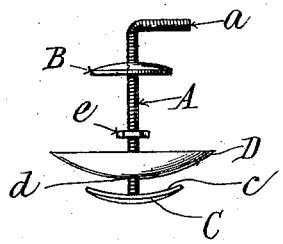
Figure 2:
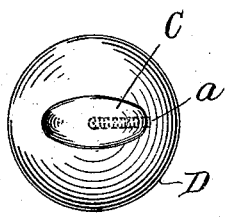
Figure 3:
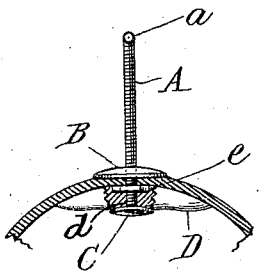

In the drawings, Figure 1 is a side view of my improved plug; Fig. 2 is a bottom view; and Fig. 3 shows the plug applied to the puncture in a section of a tire, the position of the parts being at right angles to that shown in Fig. 1, and the rubber disk being partially broken away.

The same parts are designated by the same reference letters in all the figures.

A screw-threaded shank, A, is provided at one end with an offset portion, a, forming a suitable finger hold for manipulating and rotating the shank which is also provided with a threaded, coöperating, retaining cap, B, and with an oval or elongated, dished head, C, rigidly attached to the shank. The longest diameter of the head C is fixed in a predetermined relation to the offset, a, and in the drawings they are illustrated as being parallel.

The head C is provided with a smooth inside surface, c, which is adapted to rest upon and rotate freely against the face of the rubber disk, D, without abrading or injuring it. This disk D has a central hole, d, through which passes the shank A; and a small nut, e, may be placed above it, on the shank A, if desired.

My improved plug may be used as follows:—Cement having been preferably first applied to the head C, and disk D, the head, C, is passed through the puncture, after which the rubber disk, D, is bent as nearly as possible parallel with the shank A and crowded through the puncture, and the small nut, e, pushed after it. The shank, A, is then rotated until the head C, disk D and nut e have been brought together; the cap B is then screwed down upon the outside of the tire, and, the shank A being rotated, by means of the finger hold, a, the members of the plug will be firmly clamped in position, grasping the tire between them and effectually closing the puncture. It will be understood that in this operation the head C will rotate against the under side of the disk D, without marring or tearing it, but, when the shank A has been well screwed up through the cap B, the head C will grip the disk D so firmly as to make an air tight joint. The predetermined relative positions of the finger hold, a, and the head, C, will enable the user to bring the head C into any desired position beneath the puncture, and to secure it in the most advantageous relation to the length of the puncture or the curve of the tire, it being understood that in the case of elongated punctures it is always desirable to have the head extended lengthwise of the puncture so as more effectually to grasp its edges.

Having thus described my invention, what I claim and desire to secure by Letters Patent of the United States is:—

1. In a tire-plug, the combination, with a screw-threaded, metallic shank provided with a transversely disposed gripping portion and with an enlarged head rigidly attached thereto, of a screw-threaded retaining cap and a flexible, supplementary, mushroomed head sliding freely upon said shank above the rigidly attached head.

2. In a tire-plug, the combination, with a screw-threaded, metallic shank provided with a transversely disposed gripping and indicating portion and with an enlarged elongated head rigidly attached thereto in a predetermined position relative to said gripping portion, of a screw-threaded retaining cap, and a supplementary head sliding freely upon said shank above the rigidly attached head.

3. In a tire-plug, the combination, with a screw-threaded, metallic shank provided with a transversely disposed gripping portion and with an enlarged head having a smooth inner surface and rigidly attached to said shank, of a screw-threaded retaining cap and a flexible, supplementary, mushroomed head sliding freely upon said shank above the rigidly attached head.

4. In a tire-plug, the combination, with a screw-threaded, metallic shank provided with a transversely disposed gripping portion and with an enlarged head rigidly attached thereto, of a screw-threaded retaining cap, a flexible, supplementary head sliding freely upon said shank above said rigidly attached head, and a supplementary nut above said supplementary head.

5. In a tire-plug, the combination, with a screw-threaded, metallic shank, provided with a transversely disposed gripping and indicating portion and with an elongated, dished head having a smooth upper surface and rigidly attached to said shank in a predetermined position relative to said gripping portion, of a screw-threaded retaining cap, a supplementary nut below said retaining cap, a centrally thickened, flexible, supplementary disk forming a head loosely mounted upon said shank and said parts being adapted to be drawn together by the rotation of said shank by means of said gripping portion.

6. In a tire-plug, the combination, with a screw-threaded, metallic shank with an enlarged head rigidly attached thereto, of a screw-threaded retaining cap and a flexible, supplementary, mushroomed head sliding freely upon said shank above and being of greater diameter than the rigidly attached head.

FRANK N. STEVENS.

Witnesses:
WM. D. NEILLEY,
JOSEPH J. LEHR.